(12) United States Patent
Mitra et al.

(10) Patent No.: US 9,975,778 B2
(45) Date of Patent: May 22, 2018

(54) METHOD OF MAKING CHEMICALLY ACTIVATED CARBON

(71) Applicant: Farad Power, Inc., Hillsborough, CA (US)

(72) Inventors: Shantanu Mitra, Hillsborough, CA (US); Vinod Nair, Coraopolis, PA (US)

(73) Assignee: Farad Power, Inc, Sunnyvale, CA (US)

( * ) Notice: Subject to any disclaimer, the term of this patent is extended or adjusted under 35 U.S.C. 154(b) by 23 days.

(21) Appl. No.: 15/255,128

(22) Filed: Sep. 1, 2016

(65) Prior Publication Data

US 2016/0368774 A1    Dec. 22, 2016

Related U.S. Application Data

(63) Continuation-in-part of application No. 15/242,113, filed on Aug. 19, 2016, now Pat. No. 9,938,152, and a continuation-in-part of application No. 15/208,336, filed on Jul. 12, 2016, now Pat. No. 9,916,938, and a continuation-in-part of application No. 14/341,725, filed on Jul. 25, 2014, now Pat. No. 9,458,021.

(51) Int. Cl.

| | |
|---|---|
| *C01B 31/12* | (2006.01) |
| *H01G 11/34* | (2013.01) |
| *C01B 32/318* | (2017.01) |
| *B01J 20/20* | (2006.01) |
| *B01J 20/30* | (2006.01) |
| *H01G 11/36* | (2013.01) |
| *H01G 11/86* | (2013.01) |
| *B01J 20/28* | (2006.01) |
| *C01B 32/30* | (2017.01) |
| *C01B 32/33* | (2017.01) |
| *C01B 32/366* | (2017.01) |
| *C01B 32/336* | (2017.01) |
| *C01B 32/348* | (2017.01) |

(52) U.S. Cl.
CPC ............ *C01B 31/125* (2013.01); *B01J 20/20* (2013.01); *B01J 20/28066* (2013.01); *B01J 20/3078* (2013.01); *B01J 20/3085* (2013.01); *C01B 32/30* (2017.08); *C01B 32/318* (2017.08); *C01B 32/33* (2017.08); *C01B 32/336* (2017.08); *C01B 32/348* (2017.08); *C01B 32/366* (2017.08); *H01G 11/34* (2013.01); *H01G 11/36* (2013.01); *H01G 11/86* (2013.01); *B01J 2220/4825* (2013.01); *C01P 2006/12* (2013.01); *Y02E 60/13* (2013.01)

(58) Field of Classification Search
CPC .......................... C01B 32/318; C01B 32/348
See application file for complete search history.

(56) References Cited

U.S. PATENT DOCUMENTS

| 5,039,651 | A | 8/1991 | Kosaka |
| 7,887,771 | B2 | 2/2011 | Sun et al. |
| 7,964,530 | B2 * | 6/2011 | Nanba ............... H01G 11/86 |
| | | | 361/502 |
| 8,057,774 | B2 | 11/2011 | Kim |
| 8,927,103 | B2 | 1/2015 | Kirschbaum |
| 2009/0213529 | A1 | 8/2009 | Gogotsi et al. |
| 2012/0148473 | A1 | 6/2012 | Kramarenko |
| 2015/0030525 | A1 | 1/2015 | Mitra |

FOREIGN PATENT DOCUMENTS

| IN | 201617015427 | 5/2016 |
| WO | WO2015058113 | 4/2015 |

OTHER PUBLICATIONS

Evans, M.J.B., et al., The production of chemically-activated carbon,Carbon, 37(2), (1999), 269-274].
Toshiro Otowa et. al. Activation Mechanism, surface properties and adsorption characteristics of KOH activated high surface area Carbon, Fundamentals of Adsorption, 1996.
Wei, L. et. al., Adv. Energy Mater., (2011), 1, p. 356.
Wang, J. et al., J. Mater. Chem., (2012), 22, 23710.
Olivares-Marin, M. et al., Preparation of activated carbon from cherry stones by chemical activation with ZnCl2, Applied Surface Science 252(17), (2006) 5967-5971].
Yakout, S.M., et al. Arabian Journal of Chemistry (2012), doi:10.1016/j.arabjc.2011.12.002.
Benaddi, H. et al., Surface functionality of activated carbons obtained from chemical activation of wood,Carbon, 38 (2000) 669-674].
Brunauer, S., et al., Adsorption of Gases in Multimolecular Layers, Journal of the American Chemical Society, (1938), 60 (2): 309-319.
El-Sayed, G.O., et al., Water Resources and Industry, (2014), 7-8, pp. 66-75.
Rennie, A. J. R. et al., Sci. Rep. (2016), 6, p. 22062.
Angelina Jane Rossiter, Solubility and Crystal Growth of Sodium Nitrate from Mixed Alcohol—Water Solvents, Thesis 2009.

* cited by examiner

*Primary Examiner* — Stuart Hendrickson
(74) *Attorney, Agent, or Firm* — Geeta Kadambi; Riddhi IP LLC

(57) ABSTRACT

A method is described to make a chemically activated carbon by first immersing a suitable carbonized material into a neutral aqueous solution of inorganic salts that constitutes the chemical activating agent. The carbonized material is then removed and forms a chemically loaded activatable material that is separately heated at temperatures up to 1000° C. to form the chemically activated carbon. An additional $CO_2$ or steam activation step is implemented to increase the surface area up to ~3000 $m^2$/gm. The chemical activating agents are nitrate salts in aqueous solutions, and may be reused since they are not directly heated as part of the activation process. The carbonized precursor materials include naturally occurring sources of carbon, synthetic polymeric materials and petroleum based sources.

18 Claims, 2 Drawing Sheets

METHOD OF MAKING CHEMICALLY ACTIVATED CARBON

CROSS-REFERENCE TO RELATED APPLICATIONS

This application is a continuation in part of and claims the benefit of U.S. application Ser. No. 15/242,113 filed on 19 Aug. 2016, U.S. application Ser. No. 15/208,336 filed on 12 Jul. 2016 and U.S. application Ser. No. 14/341,725 filed on 25 Jun. 2014, the contents of which are incorporated in their entirety.

FIELD OF TECHNOLOGY

This disclosure generally relates to a method of making a chemically activated carbon.

BACKGROUND

Activated carbon is currently manufactured from a number of different sources like coconut-shell, coal, wood, etc., although coconut-shell is favored for high-end applications like electric double layer capacitors (EDLC). The main processes involved in the production of activated carbon from natural sources are: i) making the char (using suitable starting materials), ii) carbonizing the char; ii) removing impurities by etching/washing, and iii) activating. Activation may be done using a number of methods including high temperature treatment under carbon dioxide ($CO_2$), oxygen ($O_2$) or steam (the activating media in these cases), although steam activation is the most popular technique. In this process, steam at around 130° C. is flowed through a fluidized bed of carbonized char particles, between temperatures of around 800° C. and around 1,000° C. This process primarily results in micro-pores (<2 nanometers (nm)) when used with relatively hard starting materials like coconut-shell. $CO_2$ activation is also a popular technique to produce porosity in different carbonized chars, although it is somewhat less efficient than steam activation (similar levels of activation require the $CO_2$ process to operate at ~100° C. higher than the steam activation process). Typical coconut-shell based activated carbon in commercial use today for EDLCs has a specific surface area around 1600 $m^2/gm$, densities in the 0.4 gm/cc range, pore sizes of <2 nm and pore volumes around 0.7 $cm^3/gm$ (e.g. for the YP-50 brand of Kuraray Chemical Co., Japan).

Chemical activation of carbon has also been used to make activated carbon from different precursor materials. With this process, in its most basic embodiment, the carbonized material—in powder form—is mixed with certain chemicals and heated. The chemicals can be a) strong bases (most common: potassium hydroxide (KOH), sodium hydroxide (NaOH)), b) acids (most common: phosphoric acid ($H_3PO_4$)], or c) salts [most common: zinc chloride ($ZnCl_2$)). Heating is typically performed at temperatures between ~400° C. and ~900° C., and depending on the starting materials, may also be carbonizing or pyrolyzing at the same time (when char is used instead of carbonized material).

Chemical activation has been shown to be effective in getting large surface-area carbons. For example, KOH activation of char from cellulose, potato starch and eucalyptus wood sawdust, have shown surface areas between 2000 $m^2/gm$ and 3000 $m^2/gm$, when heating a mixture of dry powders of the char and KOH between 700° C. and 800° C. for 1 hour [L. Wei, et. al., 2011]. KOH activation of chars produced from sucrose resulted in a surface area of 2520 $m^2/gm$ when heated to 815° C. with a KOH to char weight ratio of 4.3 to 1 [Evans, M. J. B. et al, 1999]. Other studies of KOH treatment resulted in 3000 $m^2/gm$ after 600° C.-900° C. activation of a mixture of KOH and petroleum coke under inert atmospheres [Otowa, T. et al., 1996]. In another example that uses KOH activation (U.S. Pat. No. 8,927,103), a combination of a carbon starting material (pitch coke), KOH and polyethylene glycol was mixed thoroughly and formed into briquettes, which were activated by heating to 850° C. under atmosphere. Once cooled, it was washed extensively with sulfuric acid and water to ensure complete removal of the excess KOH and other reaction by-products.

Despite the high surface area of carbon obtained with KOH activation, this process is only in limited commercial use today—due primarily to its higher manufacturing cost compared to steam activation. A detailed examination of the KOH activation processes referenced above shows the following characteristics:

a. The ratio of KOH to carbon (by weight) is typically 3:1 to 4:1. This means that for every Kg of carbonized starting material, an additional cost of ~4 times the cost of a Kg of KOH has to be added;
b. The potassium-containing by-products from the process have to be washed thoroughly (with water, solvents or acids) and disposed of, adding cost;
c. Finally, special handling and equipment are required due to the corrosive nature of KOH.

The mechanisms of KOH activation include the formation of metallic K above 700° C. [Wang, J. et al., 2012], which is highly reactive and needs to be appropriately handled.

Consequently, there exists a need for a simpler process that does not utilize harsh chemicals like the strong bases described above (e.g. KOH), that needs significantly lesser quantities of activating materials and does not require special handling equipment.

Chemical activation has also been done using salts like $ZnCl_2$. U.S. Pat. No. 5,039,651 outlines a process for producing different shapes of activated carbon (disks, flats, etc.) by mixing the carbon precursor in powder form with an aqueous solution of zinc chloride. The ratio of the carbonized material to the dry weight of $ZnCl_2$ varies between 1 to 0.6 and 1 to 3, although the highest surface areas obtained with this method were ~1400 $m^2/gm$ (corresponding to the 1 to 1.25 ratio of carbonized material to $ZnCl_2$). The carbon precursors here may be coconut shell, wood chips, saw dust, etc. Another example of $ZnCl_2$ activation uses cherry pits as the carbon source, and resulted in 1971 $m^2/gm$ when the amount of $ZnCl_2$ used was 5 times that of the carbon precursors [Olivares-Marin, M. et al., 2006]. Additionally, similar to the KOH activation processes (e.g. Evans, M. J. B. et al, 1999), the large amount of excess material needs to be washed, removed and disposed of appropriately, resulting in added costs to the manufacturing process.

Acids have also been used for chemical activation. Phosphoric acid solutions with concentrations of 80% resulted in activated carbon from olive pit precursors with a maximum surface area of ~1200 $m^2/gm$ after 4 hours at 500° C. [Yakout, S. M., et al. 2012]. Assuming linear scale up from the methods described by Yakout et al., the volume of phosphoric acid required to produce 1 kg of activated carbon in an industrial scale setting is around 12 liters. $H_3PO_4$ activation of corncob resulted in a maximum of ~700 $m^2/gin$ when pyrolyzed at 400° C. [El-Sayed, G. O., et al., 2014]. When wood was used as the precursor material, $H_3PO_4$ activation was found to give the best results of 1780 $m^2/gm$ when activated at 440° C. [Benaddi, H. et al., 2000] but even after removal of the excess phosphoric acid, chemical analysis showed about 0.4% phosphorous remaining. This level of impurity is not suitable for high-end applications like EDLC electrodes, which need phosphorus levels to be below 50 ppm. In all these examples, the amount of acid required was up to 5 times the weight of the carbon precursor materials. Overall, the use of acids as chemical activating agents is in limited industrial use due to the added costs associated with the material, handling systems and waste disposal.

While chemical activation methods do have the potential to create high surface area activated carbons, improvements in the process to lower costs and make the process simpler and safer, are desired.

SUMMARY

We describe herein a method of chemical activation that may be used to produce a high surface area activated carbon material. In the instant disclosure a method to activate a carbonized material using a mild activation agent comprising a neutral aqueous solution of inorganic salts, in relatively low volumes and without the need to manage harsh chemical environments, is described. The carbonized material is defined as a material that is obtained after heating a suitable carbon precursor material under inert atmospheres, typically at temperatures up to around 600° C. The carbon precursor materials include naturally occurring sources of carbon (e.g. coconut-shell, fruit pits, seeds, potato starch, wheat straw, cellulose and wood), synthetic polymeric materials (e.g. furfuryl-functional group containing liquids; phenol-formaldehyde resins, etc.) and petroleum based sources (e.g. petroleum pitch). The carbonization step effectively drives out all volatile organic compounds and any condensation by-products (in the case of the synthetic polymeric materials).

In one embodiment, the chemically activated carbon is made by exposing the carbonized material to a chemical activating agent, followed by heating. The exposure of the carbonized material to the chemical activating agent involves the immersion of the carbonized material into a solution of the chemical activating agent—followed by its removal from the solution—to create a so-called chemically-loaded activatable material. In this embodiment, the immersion and removal of the carbonized material into and from a solution of the chemical activating agent, followed by the heat treatments, comprise the chemical activation steps that are needed to make chemically activated carbon. In another embodiment, the chemically activated carbon is made by first converting a carbonized material into a chemically-loaded activatable material, then converting it to a chemically activated material by heating, and further activating it by $CO_2$ or steam activation techniques to make chemically activated carbon. Accordingly, one aspect of the method uses a salt like sodium nitrate ($NaNO_3$)—which is neutral in aqueous solution as the chemical activating agent. In its basic embodiment, the method utilizes a 1.5 molar solution of $NaNO_3$ in water and ethanol, to immerse the carbonized material particles in. The so-called chemically-loaded activatable carbon is then removed, heated at moderately elevated temperatures up to around 300° C., under air, to chemically activate it. The activated material is then thoroughly washed in de-ionized (DI) water (boiled and rinsed) to remove any residue of $NaNO_3$, and is ready for additional $CO_2$ or steam activation steps (e.g. heating at 950° C. under $CO_2$).

In another aspect, a higher temperature treatment is used to activate the loaded carbon after soaking is performed in the $NaNO_3$ solution. Accordingly, the chemically loaded activatable material is heated at temperatures between 600° C. and 800° C. This treatment alone, without any further $CO_2$ or steam activation, resulted in a surface area of 606 $m^2/gm$ (when heating was carried out at 600° C. under nitrogen, in one embodiment). In another embodiment, heating at higher temperatures up to around 800° C. may be performed to achieve larger surface area. Following this higher temperature treatment, the chemically activated material may be further activated using $CO_2$ or steam, after it is thoroughly washed (boiled and rinsed) in DI-water to remove excess $NaNO_3$ and any activation by-products. Heating to temperatures up to ~300° C. is performed under air, while higher temperatures require inert atmospheres like nitrogen.

In yet another aspect, the higher temperature step (600° C.-800° C.) is combined with the lower temperature treatment. In this embodiment, the chemically loaded activatable material is first heated at 200° C. to 300° C. for several hours in air, followed by a 600° C. to 800° C. treatment under nitrogen, followed by the necessary washing step to remove excess $NaNO_3$ and any by-products obtained from the heating steps. $CO_2$ or steam activation may also be performed, at this stage, to further increase the surface area. In a further embodiment, the chemically loaded activatable material is directly subjected to a high temperature $CO_2$ or steam activation step, followed by the necessary washing step to remove excess $NaNO_3$ and by-products. Unlike the prior art describing chemical activation, the various embodiments of our method do not actually involve heating the bulk activating chemicals directly ($NaNO_3$ in this case) to elevated temperatures. Since the nitrate salt solution used to immerse the carbonized material in, is not heated directly, it is available to be recycled and reused (by drying the solution to precipitate out the remaining $NaNO_3$).

Other objects of the invention may be apparent to one skilled in the art upon reading the following specification and claims.

BRIEF DESCRIPTION OF THE DRAWINGS

Example embodiments are illustrated by way of example and not limitation in the figures of the accompanying drawings, in which like references indicate similar elements and in which.

Figure 1:
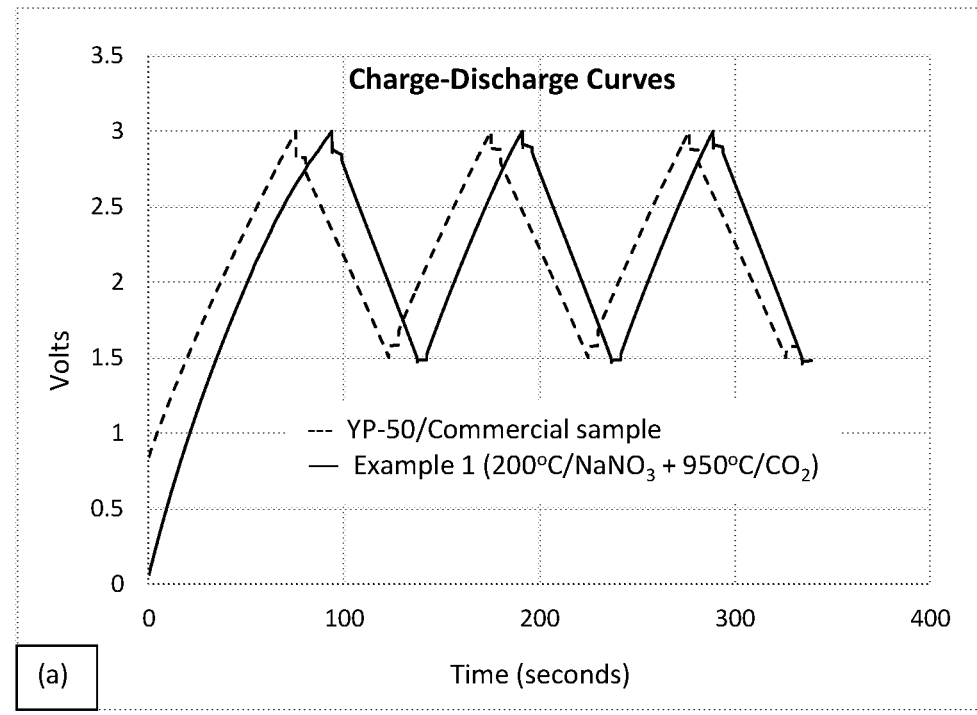
FIG. 1a shows representative charge-discharge curves.
FIG. 1b shows representative self-discharge curves obtained from LUX devices fabricated using chemically activated carbon (described in example 1). The carbonized materials used for the $NaNO_3$ treatment were made using the processes described in U.S. patent application Ser. No. 15/242,113, via polymerization of furfuryl alcohol with organic acid catalysts and carbon black additives. Also included in the figure are representative curves for a similar EDLC device fabricated using commercially available activated carbon.

Other features of the present embodiments will be apparent from the accompanying drawings and from the detailed description that follows.

DETAILED DESCRIPTION

This disclosure describes a process that has been shown to result in surface areas as high as 3000 $m^2/gm$—when applied to the same carbon starting materials used in our earlier disclosure (U.S. patent application Ser. No. 15/242, 113).

Recently, we have described a process to synthesize activated carbon from pure starting materials like furfuryl alcohol and acetyl furan (US patent publication US20150030525. EPO publication WO2015058113 and U.S. patent application Ser. No. 15/242,113). All of these disclosures describe a method to polymerize furfuryl-functional-group containing liquid starting materials with catalysts like silane, alumina powders or organic acids. Etching to remove the catalyst residue is required in some of the cases, prior to carbonizing, after which the material is ready for activation. Using $CO_2$ activation, we demonstrated surface areas of 1194 to 1941 $m^2/gm$ corresponding to activation yields of 61% and 21.7%, based on the weight of carbon before and after activation (U.S. patent application Ser. No. 15/242,113). Getting to surface areas greater than 2000 $m^2/gm$ using $CO_2$ or steam activation techniques with furfuryl based polymers would require longer activation times which, in turn, would result in lower yields and higher burn-off.

To evaluate the effectiveness of the instant chemical activation method we have made activated carbon using the previously disclosed methods, but with the addition of our chemical activation step. Using the new method, we obtained surface areas much larger than a $CO_2$ activation method alone obtained. The chemical activation process described below uses examples that are specific to the EDLC application, although all the other typical activated carbon applications may also be addressed with the activated carbons created using these methods. Moreover, the immersion in the chemical activation agent solution followed by high temperature heating may also be used by itself to create activated carbons suitable for specific activations, based on the pore sizes obtained with this method.

The uniqueness of our process is that it may also be considered as an intermediate process step in the existing manufacturing flow currently used to make activated carbon, i.e. [char formation]→[carbonization]→[steam activation]. The chemical activation process steps we describe here may be inserted between the carbonization and steam activation steps, resulting in larger surface areas than typically obtained without the chemical activation step. Moreover, no special equipment is needed to implement our chemical activation process and it may thus be accommodated into existing manufacturing infrastructure. Additionally, our process uses far less of the activating chemicals (<0.25 times the weight of the carbonized material) than what is used with the existing chemical activation methods (weight of KOH or acid=2 to 5 times weight of carbonized material).

In one embodiment, the method involves preparing a solution of a nitrate salt (like sodium nitrate) in water and alcohol (e.g. ethanol). $NaNO_3$ is highly soluble in water, with about 100 gm of the salt going into solution in 100 gm of water [Rossiter, A. J., 2009]. However, in the presence of alcohols like ethanol, methanol, isopropanol, etc., the overall solubility of $NaNO_3$ is reduced. For example, for a 100 ml water/100 ml ethanol solution (for which the mass fraction of ethanol is calculated to be ~44%), the solubility of $NaNO_3$ is ~27 gm at 20° C. and ~29.75 gms at 30° C. [Rossiter. A. J., 2009]. For carrying out the method the following ratios: 25 gms of $NaNO_3$ in 100 ml of water and 100 ml of reagent alcohol (a mixture of ~90% ethanol, ~4.5% methanol, with the remainder being isopropanol) are used. With this combination of solvent, $NaNO_3$ was completely soluble at room temperature.

Once the solution is prepared, the carbonized material (which is first pulverized to create particles of around 2 mm and below, in size) is immersed in the solution at room temperature for several hours. In one embodiment 100 gms of carbonized material (prepared by polymerizing furfuryl alcohol with organic acids and carbon black) were immersed into this solution. In this particular case, the weight ratio of $NaNO_3$ to carbonized material is 0.25 to 1. This is significantly less than the typical 3 to 1 (and higher) weight ratios (of chemical activating agent to carbonized material) required with the chemical activation techniques described earlier.

After soaking, the chemically loaded activatable material was removed and allowed to air dry. All excess $NaNO_3$ that may have precipitated after drying, is rinsed away with DI-water. Next, the material is heated at a temperature up to 300° C., under air. Since $NaNO_3$ melts at 308° C. and carbon black starts degrading beyond ~400° C. when heated in air, heat treatment under air is carried out up to a maximum of ~300° C. Holding times for this step are usually several hours, and may be varied to obtain different values of the final surface area.

At this stage, the resulting material is considered chemically activated and may be either subjected to a $CO_2$ or steam activation treatment or optionally heated again at a higher temperature (600° C. to 800° C.) for an additional higher temperature chemical activation step. If $CO_2$ or steam activation is used, then the material is thoroughly washed (boiled and rinsed) in de-ionized water prior to this. If an additional higher temperature treatment is used, then, this is performed at temperatures up to around 800° C., under nitrogen, followed by the thorough washing step. In another embodiment, the material may be $CO_2$ or steam activated after the 800° C. step, to yield even higher surface areas. In yet another embodiment, the washing steps after the $NaNO_3$ soaking and heating steps may be done using HCl solutions (example: 4% (weight) in water). If HCl is used to remove excess $NaNO_3$ and by-products, then a final washing step in DI-water is required until the pH of the rinse-water is neutral. In another embodiment, the mixture of the carbonized material in the $NaNO_3$ solution was subjected to ultrasonic vibration for up to 30 minutes. All the embodiments referenced above are used in the examples described herein to show their effect on the surface area of the final activated carbon.

Example 1

In this embodiment 150 ml of Furfuryl alcohol (W249106, >=98%, Sigma-Aldrich, St. Louis, Mo.) was stirred for few minutes in a glass jar using an overhead stirrer operating at around 200 rpm. Next, a mixture of organic acids comprising: i) oxalic acid=3.8 gms (75688, anhydrous, >99.0%, Sigma-Aldrich, St. Louis, Mo.), ii) maleic acid=4.9 gms (M0375, >99.0% (HPLC), Sigma-Aldrich, St. Louis, Mo.), and iii) L-(+)-tartaric acid=6.3 gms (T109, >99.5%, Sigma-Aldrich, St. Louis, Mo.) was added and stirring was continued for another 120 minutes. The solution was allowed to stand at room temperature for several hours, before 4.28 gms of carbon black (C-NERGY SUPER C45 from Imerys, Willebroek, Belgium) was added and the mixture stirred for an additional 180 minutes. The set-up and composition of starting materials have already been described in an earlier disclosure [U.S. patent application Ser. No. 15/242,113]. The mixture was then allowed to stand at room temperature, under air, until no further significant weight loss was observed. It was then subjected to heat treatments at 40° C., 80° C., 125° C. and 192° C., all under air, to create a dense solid.

Next, the polymerized material was prepared for carbonization at 600° C. Carbonization was done in two steps: i) soaking at an intermediate temperature (360° C.) under air, and ii) soaking at 600° C. under nitrogen. The carbonized material was then pulverized into smaller particles in a mortar and pestle, resulting in particle sizes in the 2 mm (and below) range.

A solution of 25 gms of $NaNO_3$ (Lab-Pro ZS0655, Sunnyvale, Calif.) in 100 ml of de-ionized water (resistivity of 18.01 megohm-cm) and 100 ml of reagent alcohol (241000200, Pharmco-Aaper, Shelbyville, Ky.) was made at room temperature. The alcohol composition was 90.65% ethanol, 4.53% methanol and 4.82% isopropyl alcohol. The carbonized material was then immersed in this solution and was allowed to soak for several hours under air, with a cover to minimize evaporation losses of the liquid. Next, the carbon was removed from the solution, air-dried and rinsed with DI-water to remove any $NaNO_3$ precipitate that appeared after drying. Then, a low temperature chemical activation step was used that involved heating the loaded carbonized material in an oven at 200° C., in air. This was followed by thoroughly washing the material in de-ionized water several times, before drying it overnight at 150° C.

At this stage, the carbon was loaded onto quartz boats (10 cm long by 4 cm wide) that were placed in a quartz tube vacuum furnace for additional $CO_2$ activation (model GSL-1100X, MTI Corporation, Richmond, Calif.). $CO_2$ activation was performed at 950° C. with $CO_2$ flowing through the tube at 3.4 liters/min. Heating was continued until 18.7% of the original weight of the carbon remained (i.e. burn-off ~81.3%).

These activated carbons were used to make EDLC electrodes by first grinding them down to an average size of ~20 to 30 microns in a stainless-steel-bladed grinder. Next, TEFLON® powder (PTFE 6C from DuPont Corporation, Wilmington, Del.) was added as a binder, and the mixture was ground again to thoroughly mix the ingredients and produce a dough-like material. Finally, this dough-like material was dry-rolling onto an aluminum sheet (33 microns thick) to form the electrode. CR2032 coin-cell sized electrodes were punched out and fabricated into cells using a standard 1M tetraethylammonium tetrafluoroborate/Acetonitrile organic electrolyte, commonly used in commercial EDLC manufacturing. CR2032 coin cell EDLC devices were also constructed using commercially available activated carbon from Kuraray Chemical, Japan (YP-50 brand). Electrical measurements were made on these cells to verify that the carbon produced by the methods described in this instant description may be used for electrodes are suitable for EDLC applications.

Figure 1B:
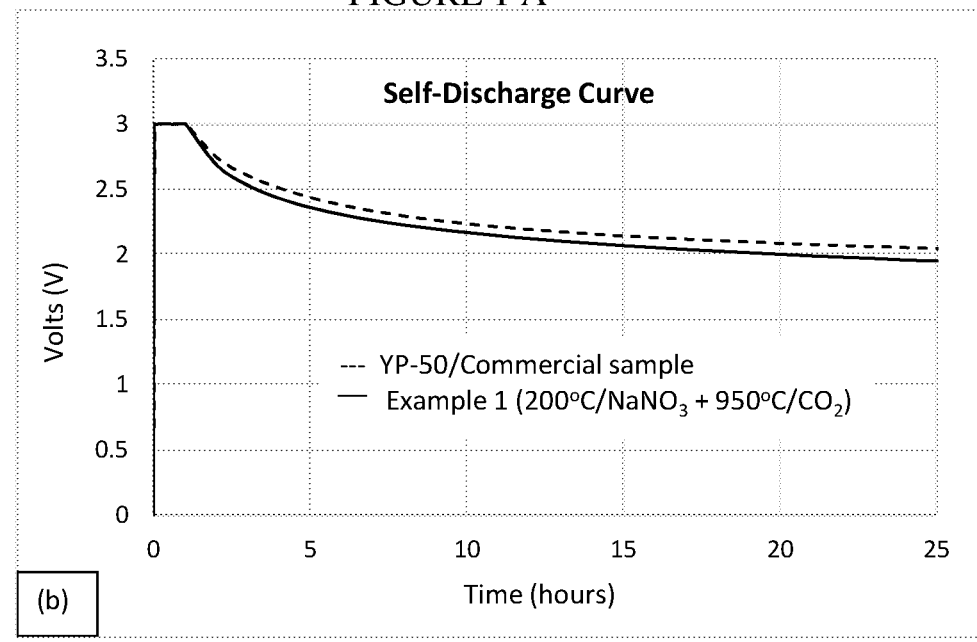

FIG. 1A and FIG. 1B, shows representative charge-discharge curves and a self-discharge curve of the coin cells fabricated using this carbon. Capacitance values are obtained from the slope of the V(t) curves, namely by dividing the current with the slope of the discharge curve. As seen here, the slopes of the charge-discharge curves for cells constructed using our carbon and the YP-50 carbon, are very similar, predicting similar capacitance values between the cells. The self-discharge plots (measured over a 24 hour period with open circuit) show a similar drop in the cell voltage between devices fabricated from carbon made using the chemical activation steps described in this example and the commercially available YP-50 activated carbon.

Table 1 compares the average specific capacitance of the activated carbon described in this example with that of the YP-50 material. As predicted from FIG. 1a, the specific capacitance values are similar for both sets of cells.

TABLE 1

Capacitance values for carbon from example 1 and commercially available YP-50 carbon, as measured from coin cells fabricated using these carbons.

| Example | $NaNO_3$ treatment | $CO_2$ activation yield | Average specific capacitance (F/gm) |
|---|---|---|---|
| 1 | 200° C. | 18.7% | 110.3 |
| YP-50 (Kuraray Chemical Co.) | — | Steam activation (yield unknown) | 108.1 |

Measurement of the surface area of this activated carbon powder was done using the BET (Brunauer, Emmett, and Teller) method [Brunauer. S et al., 1938]. Measurements were made on a Micromeretics TriStar™ II 3020 instrument, using nitrogen as the adsorptive gas. Nitrogen isotherms were obtained at 77K after the samples were degassed for 1 hour at 90° C., followed by 16 hours at 300° C. The isotherms were fitted to the BET equation to obtain surface area. Total pore volumes were obtained from a point on the isotherm at a relative pressure $(P/P_0)>0.98$. The results are shown in Table 2. As a comparison, we have also measured the surface area and pore volume (using the same methods) of a commercial sample (YP-50). Also included in the table are the measurement data (BET surface area and pore volumes) of activated carbon samples fabricated using our previously disclosed method (U.S. patent application Ser. No. 15/242,113—which only differs from the method described here with respect to the additional $NaNO_3$ activation step.

TABLE 2

Comparison of surface area and pore volumes of example 1 carbon ($NaNO_3$ and $CO_2$ activation) with commercially available YP-50 carbon (steam activation) and carbons activated using $CO_2$ only.

| Example | $NaNO_3$ treatment | $CO_2$ activation yield | BET surface area ($m^2$/gm) | Pore volume ($cm^3$/gm) |
|---|---|---|---|---|
| 1 | 200° C. | 18.7% | 2732.9 | 1.538 |
| Previous example* | None | 21.7% | 1941.14 | 1.324 |
| Previous example* | None | 29.7% | 1686.29 | 0.984 |
| Previous example* | None | 35% | 1576.42 | 0.939 |
| YP-50 (Kuraray Chemical) | None | unknown | 1611.31 | 0.747 |

*Described in U.S. patent application Ser. No. 15/242,113.

In the present method, soaking in the $NaNO_3$ solution and the 200° C. treatment before $CO_2$ activation resulted in a significant increase in the specific surface area (2732 $m^2$/gm) and pore volume (1.5 $cm^3$/gm). The capacitance values, however, are similar to that obtained with the YP-50 materials. This may be attributed, in part, to the fact that our carbons were not optimally 'size-reduced' by fluidized-bed jet-milling methods (which are currently used on the commercially available carbons). This lack of further particle size reduction of our carbon resulted in lower-density electrodes due to poor packing density of the carbon particles in the electrode. This particle size effect is well documented [Rennie, A. J. R. et al., 2016].

Example 2

In this embodiment, 150 ml of Furfuryl alcohol (Sigma-Aldrich) was stirred for few minutes in a glass jar using an overhead stirrer operating at around 200 rpm. Next, a mixture of organic acids comprising: i) Oxalic acid=3.8 gms (Sigma-Aldrich), ii) Maleic acid=4.9 gms (Sigma-Aldrich), and iii) L-(+)-Tartaric acid=6.3 gms (Sigma-Aldrich) was added and stirring was continued for another 90 minutes. Next, 2.25 gms of carbon black (C-NERGY SUPER C45) was added and the mixture stirred for an additional 150 minutes. The composition of starting materials differs from the embodiment of example 1 in the amount of carbon black used. The mixture was then allowed to stand at room temperature under air until no further significant weight loss was observed. It was then subjected to heat treatments at 48° C., 80° C., 125° C. and 200° C., all under air, followed by a single step carbonization at 600° C. under nitrogen (unlike the carbonization treatment of example 1).

The carbonized material was then pulverized into smaller particles in a mortar and pestle, resulting in particle sizes in the 2 mm (and below) range. Again, a solution of 25 gms of $NaNO_3$ (Lab-Pro, Sunnyvale, Calif.) in 100 ml of de-ionized water (resistivity of 18.01 megohm-cm) and 100 ml of reagent alcohol (Pharmco-Aaper) was made at room temperature. The alcohol composition has been described earlier. The carbonized material was then immersed in this solution and allowed to soak for several hours under air, with a cover to minimize evaporation losses of the liquid. It was then removed from the solution, rinsed in DI-water to remove any $NaNO_3$ precipitation. The material was then chemically activated by heating in an oven at 200° C. for several hours, under air. This was followed by an additional higher temperature chemical activation step which involved heating the material at 600° C. under nitrogen for 1 hour in a quartz tube furnace. After this, the carbon was thoroughly washed (boiled in DI-water several times) to remove any remaining $NaNO_3$ or related by-products before being activated using $CO_2$—similar to example 1. Activation yield of 20.4% was achieved (i.e. burn-off ~79.6%) for the $CO_2$ activation step.

Similarities between this embodiment and the previous one include same $NaNO_3$ solution; similar soak at room temperature; similar initial 200° C. treatment. Beyond this, the current embodiment adds a higher temperature chemical activation step (600° C. heating), before washing to remove all $NaNO_3$ (and by-products).

This activated carbon material was used to make several EDLC devices—with the method described earlier. Charge-discharge and self-discharge curves for these EDLC devices look similar to those in FIG. 1a and FIG. 1b, and are not reproduced here. Capacitance values were calculated from the slope of the discharge curves and an average value is shown in Table 3, along with similar data from example 1. On comparing the average specific capacitance values obtained from examples 1 and 2, it can be seen that the addition of the higher temperature (600° C.) chemical activation step in example 2 results in a larger value, despite lower burn-off from the subsequent $CO_2$ activation step.

TABLE 3

Effect of a higher temperature chemical activation step on the performance of the activated carbon made from furfuryl alcohol.

| Example | $NaNO_3$ treatment | $NaNO_3$ treatment | $CO_2$ activation yield | Average Specific capacitance (F/g) |
|---|---|---|---|---|
| 1 | 200° C. | — | 18.7% | 110.3 |
| 2 | 200° C. | 600° C. | 20.4% | 126.5 |

BET surface area measurements were done using the setup described earlier. Nitrogen isotherms were obtained at 77K after the samples were degassed for 1 hour at 90° C., followed by 16 hours at 300° C. The isotherms were fitted to the BET equation to obtain surface area. Total pore volumes were obtained from a point on the isotherm at a relative pressure $(P/P_0)>0.98$. The results are shown in Table 4, for samples from this example (2) and the previous one (1). Also included in table 4 are data from BET surface area and pore volume measurements done on a sample of material from example 2, but before any $CO_2$ activation (i.e. with only the 200° C. and 600° C. $NaNO_3$ treatments).

TABLE 4

Effect of two-stage $NaNO_3$ activation (200° C. and 600° C.) and $CO_2$ activation on the surface area and pore volumes of activated carbons made from furfuryl alcohol.

| Example | $NaNO_3$ treatment | $NaNO_3$ treatment | $CO_2$ activation yield | BET surface area (m²/gm) | Pore volume (cm³/gm) |
|---|---|---|---|---|---|
| 2 | 200° C. | 600° C. | 20.4% | 2954.9 | 1.552 |
| 2 | 200° C. | 600° C. | — | 606.40 | 0.245 |
| 1 | 200° C. | — | 18.7% | 2732.9 | 1.538 |

The additional heat treatment at 600° C. of example 2 (Table 4), in conjunction with the $CO_2$ activation, resulted in a higher surface area of 2954 m²/gm, compared to the data from example 1. Meanwhile, the pore volumes of example 2 after $CO_2$ activation are also larger than the pore volumes of example 1. Also, for example 2, the BET surface area after the $NaNO_3$ treatment only, was measured to be 606 m²/gm (no $CO_2$ activation). Higher activation temperatures (800° C. instead of 600° C.) and longer soak times at temperature, are expected to increase this value.

Example 3

In this embodiment, furfuryl alcohol and silane are used as the starting materials (as in US patent publication US20150030525). 100 ml of Furfuryl alcohol (Sigma-Aldrich) was mixed with 100 ml of acetone (HPLC grade, 329000000, from Pharmaco-Aaper, Shelbyville, Ky.), and stirred for few minutes in a glass jar. Then 2 ml of dichlorodimethylsilane, $(CH_3)_2SiCl_2$, (440272, Sigma-Aldrich, St. Louis, Mo.) was added and the mixture stirred for 45 minutes before 2 gms of carbon black (C-NERGY SUPER C45) was added. Stirring was continued for an additional 45 minutes. The solution was allowed to stand at room temperature under air until no further significant weight loss was observed. It was then subjected to further heat treatment at 75° C., 120° C., and 200° C., all under air, and carbonized at 600° C. under nitrogen.

The carbonized material was then pulverized into smaller particles in a mortar and pestle, resulting in particle sizes in the 2 mm (and below) range. Similar to the previous examples, a solution of 25 gms of $NaNO_3$ in 100 ml of de-ionized water and 100 ml of reagent was prepared. The carbonized material was immersed in this solution and allowed to soak for several hours under air, with a cover to minimize the evaporation losses of the liquid. It was then removed from the solution, air dried, and chemically activated by directly heated in an oven at 200° C., under air. Unlike the previous examples, the carbonized material was not washed or rinsed before the 200° C. treatment. Following the 200° C. treatment, it was boiled for at least 1 hour and rinsed 3 times before drying. At this stage, the carbon was activated at 950° C. using $CO_2$. Activation yield of ~22.6% was achieved (i.e. burn-off 77.4%).

These activated carbon samples were then used to make EDLC electrodes—with the method described earlier. Similar measurements of EDLC electrical performance and BET surface area were made. Table 5 shows the average values of specific capacitance of the coin-cell EDLC devices made with this carbon. Charge-discharge curves and self-discharge curves are similar to those shown earlier and are not reproduced here. BET measurement results (included in Table 5) also show a large surface area of 2457 $m^2$/gm, with a pore volume of 1.434 $cm^3$/gm.

TABLE 5

Capacitance, surface area and pore volume of a chemically activated carbon made from furfuryl alcohol and silane.

| Example | $NaNO_3$ treatment | $CO_2$ activation yield | Average Specific Capacitance (F/g) | BET surface area ($m^2$/gm) | Pore volume ($cm^3$/gm) |
|---|---|---|---|---|---|
| 3 | 200° C. | 22.6% | 107.4 | 2457.5 | 1.434 |

To evaluate the role of the intermediate washing and rinsing steps, and the additional high-temperature heating step used in the various embodiments described above, we have combined data from all the examples above (s 1, 2 and 3) and normalized them to the same $CO_2$ activation yield. Since all the 3 samples had linear $CO_2$ activation curves (i.e. activation weight/yield versus time), it is a fair assumption that the surface area values would also scale linearly with $CO_2$ activation yield (same activation mechanism is assumed for all samples). The validity of the assumption (that the $CO_2$ activation yield is linear) may be tested by extrapolating from the measured data, the surface area value corresponding to a $CO_2$ activation yield of 100% (i.e. before $CO_2$ activation). Thus, a measured area of 2954 $m^2$/gm (with an activation yield of 20.4%) is extrapolated back to 602 $m^2$/gm (with an activation yield of 100%). This value compares very well with the measured value of 606.4 $m^2$/gm in example 2 (obtained right after the $NaNO_3$ treatment, before any $CO_2$ activation). Table 6 shows the process steps involved with the different examples described above, along with a normalized value for specific surface area, assuming a 20.4% activation yield for all 3 examples. After normalizing, the best surface area value is still obtained with the extra 600° C. treatment (example 2).

TABLE 6

Effect of washing steps during the chemical activation process on the final surface area (normalized to the same $CO_2$ activation levels).

| Example | Starting Material | 1 Process step | 2 Process step | 3 Process step | 4 Process step | 5 Process step | 6 Process step | $CO_2$ Activation Yield (%) | BET surface area (m2/gm) Measured | Normalized to 20.4% ($CO_2$) yield |
|---|---|---|---|---|---|---|---|---|---|---|
| 1 | FA/OA + CB | Soak in $NaNO_3$ solution | Rinse | 200° C. | Boil/rinse | — | — | 18.70% | 2732.9 | 2505.2 |
| 2 | FA/OC + CB | Soak in $NaNO_3$ solution | Rinse | 200° C. | Rinse | 600° C. | Boil/rinse | 20.40% | 2954.9 | 2954.9 |
| 3 | FA/Sil + CB | — | — | 200° C. | Boil/rinse | — | — | 22.60% | 2457.5 | 2722.5 |

FA = furfuryl alcohol;
OA = organic acid combination;
Sil = Dichlorodimethylsilane;
CB = carbon black Comparing examples 1 and 3, shows that the absence of a rinse step after soaking the carbonized material in the $NaNO_3$ solution, results in a higher surface area—for the same level of $CO_2$ activation (normalized value in the table). Based on this, if the rinse steps in example 2 are removed after room temperature soaking and after 200° C. treatment (in Table 6), one may expect even larger values of specific surface area. Additionally, it is expected that increasing the process temperatures to 300° C. and 800° C., respectively, for the two temperature treatments in process steps 3 and 5 (in Table 6) will also result in higher surface areas, whether the $NaNO_3$ treatment is used by itself or in conjunction with a subsequent $CO_2$ activation step.

Example 4

Finally, we have also used this $NaNO_3$ soaking treatment on coconut-shell char. In this embodiment, we first carbonized the coconut-shell char at 600° C. under nitrogen for 1 hour to drive out the volatile organic compounds. Next, we prepared a solution of $NaNO_3$ in DI-water and reagent alcohol (similar to that described earlier) and soaked the carbonized char in the solution for several hours. After this, we removed the carbonized char from the solution and rinsed it with DI-water before placing it in an oven at 200° C. under air for several hours to perform the chemical activation step. Following this, a higher temperature chemical activation step was also used by heating the material at 600° C. under nitrogen. This was done in a quartz tube furnace. After this, the carbon was thoroughly washed in a 4% (by weight) HCl solution by boiling it for 1 hour, followed by several DI-water rinses, until the rinse water showed a neutral pH value. Next, the material was prepared for $CO_2$ activation, which was performed in a quartz tube furnace at 950° C. Activation was continued until a yield of 30% was achieved (i.e. 70% burn-off).

The material was then evaluated for surface area and pore volume using the same techniques as described earlier. Measurement data are shown in Table 7. Also included in the table are data for commercially available coconut-shell based activated carbon from Kuraray Chemical, Japan. The low and high temperature $NaNO_3$ treatment along with the $CO_2$ activation step used on the coconut-shell carbonized char described here, resulted in a higher specific surface area compared to the steam activated commercially available carbon. We have also measured the BET surface area of this carbon directly after the $NaNO_3$ treatment (before any $CO_2$ activation). This measurement resulted in a surface area of 545 $m^2/gm$ and a pore volume of 0.229 $cm^3/gm$. Similar BET surface area measurements before $NaNO_3$ treatment resulted in a value of 200 $m^2/gm$.

TABLE 7

Surface area and pore volume of chemically activated and commercially available, steam activated coconut-shell carbon.

| Example | Process step | $NaNO_3$ treatment | $NaNO_3$ treatment | Process step | $CO_2$ activation yield | BET surface area ($m^2$/gm) | Pore volume (cc/gm) |
|---|---|---|---|---|---|---|---|
| 4 | Rinse | 200° C. | 600° C. | HCl boil/Rinse | 30% | 2202 | 1.006 |
| YP-50 (Kuraray Chemical, Japan) | — | — | — | — | Unknown (Steam activation) | 1611.31 | 0.747 |

A process flow chart based on the methods outlined in the embodiments described above is shown in FIG. 2. Also included is the process of polymerizing furfuryl-functional-group containing starting materials [U.S. patent application Ser. No. 15/242,113] to make the carbonized material, which is the starting point for the chemical activation process described here. As seen from this chart, several other process variations are possible. For example, the lower temperature treatment may be increased up to around 300° C., the higher temperature treatment may be increased to ~800° C. (there is no reason it can't be increased beyond this to 900° C. or 1000° C., although those temperatures are more in line with the $CO_2$ and steam activation steps). Also, when both the 300° C. and the 800° C. treatment are used, an intermediate washing step is not required. Regardless of what combination of temperatures are used, a final thorough washing (boil/rinse) is required to ensure removal of all excess $NaNO_3$ and related by-products. DI-water or an HCl solution may be used for this thorough washing step, followed by several rinses in DI-water.

Figure 2:
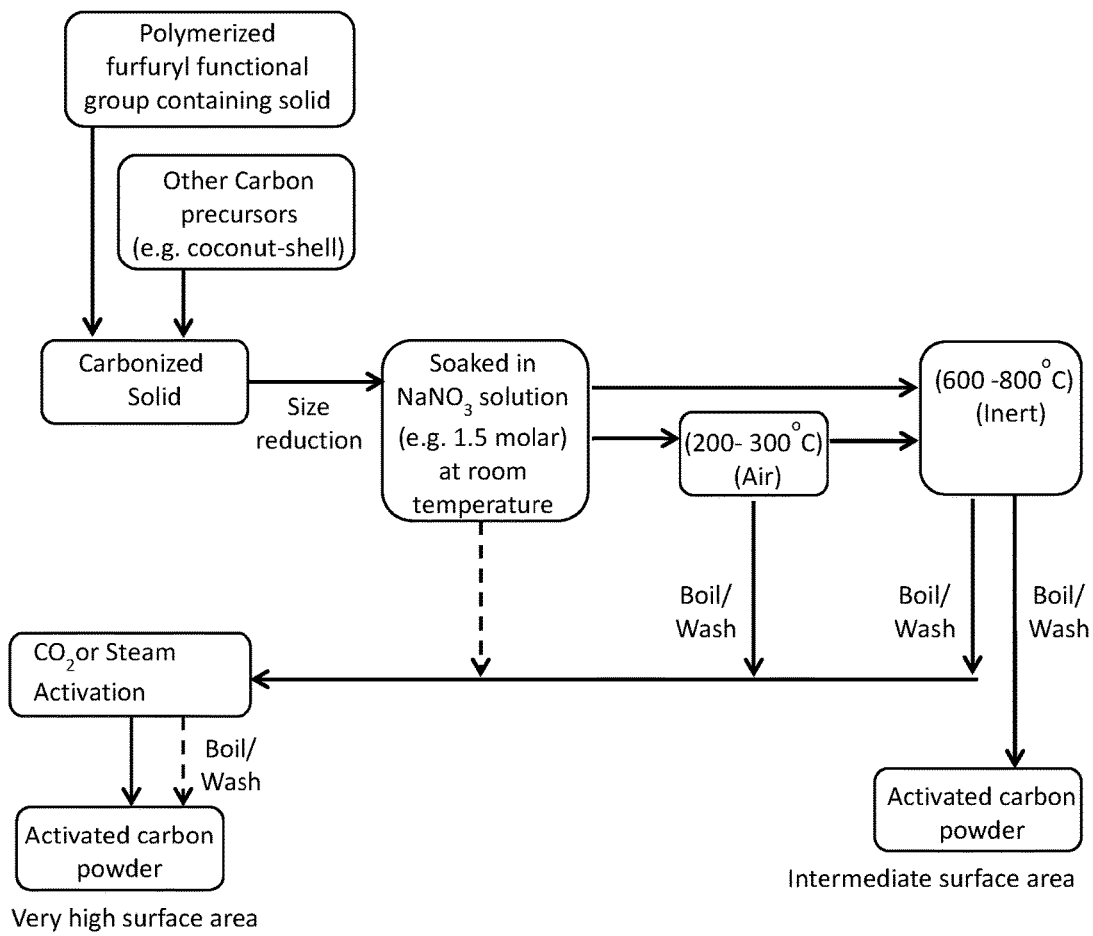
FIG. 2 shows a schematic process flow chart for carrying out the chemical activation methods described in this disclosure. It also shows the different starting materials that may be used to make the carbonized material, which forms the starting point for the chemical activation method described here. It also shows the various options for combining different heat treatments after the $NaNO_3$ soaking step, to obtain the final chemically activated carbon.

When larger surface areas are desired, the $NaNO_3$ treatment may be used in conjunction with a subsequent $CO_2$ or steam activation method. It is possible to consider the $CO_2$ or steam activation step after either the low temperature chemical activation step (300° C.) or after the high-temperature step (800° C.), or after a combination of both. Additionally, using $CO_2$ or steam activation directly after the initial soaking step (carbonized material in $NaNO_3$ solution at room temperature) is also possible. In that case, however, washing to remove the excess chemical by-products will have to be done after $CO_2$ or steam activation. It is also shown that carbonized materials from naturally occurring precursors, like coconut-shell, exhibit similar improvements in surface area when the $NaNO_3$ activation methods described herein, are used in conjunction with $CO_2$ or steam activation. These coconut-shell based carbon precursors are shown in FIG. 2 as an additional input into the carbonized material starting point for our chemical activation process.

This process may also be carried out with solutions of nitrates other than $NaNO_3$. Calcium nitrate ($Ca(NO_3)_2$), aluminum nitrate ($Al(NO_3)_3$), magnesium nitrate ($Mg(NO_3)_2$), cobalt nitrate ($Co(NO_3)_2$), lithium nitrate ($LiNO_3$) all have good solubility in water and ethanol, and are good candidates for the chemical activation process described here. Also, potassium nitrate ($KNO_3$), which is moderately soluble in water, with limited solubility in ethanol, could be a candidate.

Although we have only used sodium nitrate in our embodiments of the method described here, it is anticipated that other salts may also show similar effects. For example, other salts like borates, nitrites, oxalates, carbonates, sulfates, sulfites, chlorides, etc., may also show similar behavior when used—instead of $NaNO_3$—in a manner similar to that described here.

We have discussed a number of examples and embodiments of the method and those skilled in the art will recognize that modifications, permutations, additions, and sub-combinations may be made to produce the same final result. It is therefore intended that any claims hereafter introduced based on the descriptions and drawings detailed above, are interpreted to include all such modifications, permutations, additions, and sub-combinations to be within their spirit and scope. As used herein, the term "embodiment" means an embodiment that serves to illustrate by way of example but not limitation.

What is claimed is:

1. A method of producing a chemically activated carbon, comprising:
   immersing a carbonized material into a solution of an inorganic salt in at least one of a water and organic solvent for a period of time to make a chemically loaded activatable material, wherein the carbonized material originates from a natural source, wherein the natural source is at least one of a coconut-shell, fruit pits, seed, potato starch, wheat straw, cellulose and wood;
   removing the chemically loaded activatable material from the solution and chemically activating by heating at a controlled temperature to make a chemically activated material, and thoroughly washing the chemically activated material to remove all residue to obtain the chemically activated carbon.

2. The method of claim 1, wherein the carbonized material originates from a petroleum-based product.

3. The method of claim 1, wherein the inorganic salt is a nitrate of at least one of a Na, K, Ca, Mg, Al, Co, Li and a combination thereof.

4. The method of claim 1, wherein the organic solvent is an alcohol, wherein the alcohol is one of a methanol, ethanol, propanol, butanol, pentanol and a combination thereof.

5. The method of claim 1, wherein the controlled temperature for chemical activating by heating between 200° C.-1000° C.

6. The method of claim 1, wherein the weight of the nitrate salt is less than 0.25 times the weight of the carbonized material being activated.

7. The method of claim 1, wherein direct heating of the nitrate salt solution is not required for activation of the carbonized material.

8. A method of producing a chemically activated carbon, comprising:
immersing a carbonized material into a solution of an inorganic nitrate salt in at least one of a water and an alcohol for a period of time to make a chemically loaded activatable material;
removing the chemically loaded activatable material from the solution and chemically activating the material by heating at a controlled temperature to make a chemically activated material;
thoroughly washing the chemically activated material to remove all residue; and
further activating the material using $CO_2$ or steam as the activating agent.

9. The method of claim 8, wherein the carbonized material is one of a polymerized and carbonized furfuryl-functional group containing compound.

10. The method of claim 8, wherein the carbonized material originates from a natural source, wherein the natural source is one of a coconut-shell, fruit pits, seed, potato starch, wheat straw, cellulose and wood.

11. The method of claim 8, wherein the carbonized material originates from petroleum-based products.

12. The method of claim 8, wherein the inorganic nitrate salt is at least one of a $NaNO_3$, $KNO_3$, $Ca(NO_3)_2$, $Mg(NO_3)_2$, $Al(NO_3)_3$, $Co(NO_3)_2$, $LiNO_3$ and combination thereof.

13. The method of claim 8, wherein the alcohol is one of a methanol, ethanol, propanol, butanol, pentanol, and a combination thereof.

14. The method of claim 8, wherein the chemical activation is done by heating between 200° C.-1000° C.

15. The method of claim 8, wherein the $CO_2$ or steam activation is done by heating under controlled temperature with at least one of a carbon dioxide, nitrogen and steam atmosphere.

16. The method of claim 8, wherein the chemically activated carbon has a surface area of greater than 2000 $m^2$/gm.

17. The method of claim 8, wherein direct heating of the nitrate salt solution used for activation is not required.

18. The method of claim 8, wherein the weight of the nitrate salt is less than 0.25 times the weight of the carbonized material being activated.

* * * * *